United States Patent [19]

Motta et al.

[11] Patent Number: 5,621,545
[45] Date of Patent: Apr. 15, 1997

[54] IMAGE PRODUCTION USING COLOR ERROR DIFFUSION

[76] Inventors: Ricardo J. Motta, 125 Eldora Dr., Mountain View, Calif. 94041; Gary J. Dispoto, 461 Central Ave., Mountain View, Calif. 94043

[21] Appl. No.: 163,953

[22] Filed: Dec. 8, 1993

[51] Int. Cl.$^6$ ............................... H04N 1/40; H04N 1/46; G03F 3/08
[52] U.S. Cl. ...................... 358/518; 358/534; 358/456; 395/109
[58] Field of Search .................... 358/500, 501, 358/518, 520, 533–536, 298, 454–457; 382/166, 167, 252, 253; 395/109; H04N 1/54

[56] References Cited

U.S. PATENT DOCUMENTS

| | | | |
|---|---|---|---|
| 4,680,645 | 7/1987 | Dispoto et al. | 358/298 |
| 4,929,978 | 5/1990 | Kanamori et al. | 355/38 |
| 5,070,413 | 12/1991 | Sullivan et al. | 358/534 |
| 5,172,237 | 12/1992 | Blonstein et al. | 358/500 |
| 5,185,661 | 9/1993 | Ng | 358/75 |
| 5,333,243 | 7/1994 | Best et al. | 358/534 |
| 5,473,446 | 12/1995 | Perumal, Jr. et al. | 358/534 |
| 5,543,940 | 8/1996 | Sherman | 358/518 |

FOREIGN PATENT DOCUMENTS

91/06174  10/1989  WIPO ................ H04N 1/46

OTHER PUBLICATIONS

Dennis Venable, Judy Stinehour, & Paul Roeting, "Selection and Use of Small Color Sets for Pictorial Display", SPSE 43rd Annual Conference, May 20–25, 1990, Rochester, NY; Society Imaging Science and Technology, Springfield, Va; pp. 90–92.

Floyd, Robert and Louis Steinberg, "An Adaptive Algorithm for Spatial Grey Scale", SID 76 Digest, p. 36.

Ulichney, Robert *Digital Halftoning*, The MIT Press, 1987, pp. 340–342.

*Primary Examiner*—Edward L. Coles, Sr.
*Assistant Examiner*—Kimberly A. Williams

[57] ABSTRACT

A color printing system includes a discrete CMY color printer, a LAB color error diffuser, and a LAB/CMY converter. The diffuser includes an image compensator, a vector color space reverter, an error calculator, and an error diffuser. The vector color space reverter provides for error diffusion in a LAB color space that is different from the CMY color space of the printer. The perceptual linearity of the LAB color space provides for enhanced color fidelity in the printed image. In addition, color conversion and error diffusion are performed together, minimizing computational error accumulation and maximizing computational throughput.

6 Claims, 2 Drawing Sheets

IMAGE PRODUCTION USING COLOR ERROR DIFFUSION

BACKGROUND OF THE INVENTION

The present invention relates to image production and, more particularly, to production of color images on a discrete-tone color production device. A major objective of the present invention is to provide for improved continuous-tone printing on a discrete-tone printer.

Despite the obvious appeal of color printers, monochrome printers dominate the marketplace for several reasons. One reason for the relative paucity of color printers is the added complexity and expense of producing color. Beyond this, there is the problem of producing or reproducing "faithful" color. Human perception can be forgiving of variations in brightness of a monochrome image, but relatively intolerant of variations in hue in a color image. For example, errors in the blue of the sky, the green of grass, and fleshtones are often quite objectionable.

Faithful color reproduction is a challenge for all color printers. In general, the image to be printed is described in a different color space than that used by the printer. For example, color images stored in computers are often edited in an RGB (red-green-blue) color space, typically used by color monitors. Printers typically print in a CMY (cyan-magenta-yellow) color space. Thus, an RGB to CMY conversion is required for printing. The color space conversion is far from trivial, and can require substantial processing. Even when the original image is nominally in the same color space as the printer, e.g., both are CMY, differences among CMY color spaces can require color conversion. Further complicating matters is the trend in small desktop printers to use black ink in addition to color inks to provide more acceptable blacks; color conversion is then to a four-dimensional space, e.g., CMYK, where "K" is black.

Even with proper color conversion, faithful color reproduction is a problem, particularly for printers that are not continuous tone. "Continuous tone" refers to a capability of producing every color within a printer's color gamut that can be distinguished by the human eye. Continuous tone printers can print thousands, if not millions, of different colors. Thus, for a continuous-tone printer, the problem of faithful color production is primarily a problem of communicating to the printer which colors to print.

Discrete-tone color printers cannot print all distinguishable colors within their gamut. Early popular ink jet printers provided only eight colors; more recent ink jet printers can provide dozens of distinguishable colors by varying dot size. Such limited color palettes are useful for "business graphics", e.g., bar graphs and pie charts, but nor for general image production. One could not, for example, faithfully reproduce a scanned photograph of a person using only dozens of colors. Despite their limitations, discrete-tone printers are relatively numerous because their purchase price and their operating costs are far below those for continuous tone printers.

Digital half-toning can be used to obtain a continuous-tone output from a discrete-tone device. Half-toning was originally used to produce gray-scale images using a black and white output device. Monochrome images in newsprint are familiar examples of monochrome halftoning. Likewise, color newsprint images are examples of color halftoning, also known as dithering.

The simplest form of half-toning uses superpixels. A pixel is an image element that contains exactly one color. A superpixel is a cluster of pixels which can contain different colors so that the gestalt can be a color that is not directly produced by the printer. The human eye spatially blends neighboring pixels to achieve the desired experience of color. Thus a eight-color printer can produce hundreds of colors using a 4-pixel superpixel; a 256-color printer can simulate continuous-tone printing. However, there is a tradeoff in spatial resolution. For example, a printer with 300 pixels-per-inch (dots-per-inch) resolution, produces a half-toned image of only 150 pixels-per-inch. Larger superpixels provide more colors with greater losses of spatial resolution. One of the most objectionable features of images half-toned using superpixels is a loss of edge definition: sharp edges become blurred.

Error diffusion is a halftone technique that preserves edge definition while providing a large number of effective colors from a color printer having a limited color palette. In error diffusion, the "source" color of a pixel is adjusted to an "adjusted" color. The "printed" color for the pixel is the one in the printer's palette most closely matching the adjusted color. The discrepancy between the adjusted color and the printed color is treated as a color error. This color error is distributed (diffused) to subsequently printed neighboring pixels. Color errors are accumulated for each subsequently printed pixel. When a pixel is processed, the accumulated error is added to the desired color to provide the adjusted color.

A typical implementation of color error diffusion would be as follows. A continuous-tone image would be converted to a continuous tone color space suitable for the printer; for example, a continuous-tone RGB to continuous-tone CMY color space conversion is implemented. Colors in the continuous-tone CMY color space are quantized to device states within the printers output palette. Error diffusion feeds the resulting quantization errors back to the continuous-tone device space for diffusion to subsequently printed neighboring pixels. Printers using this approach, including the popular Deskjet 500C and 550C ink jet printers, have provided relatively faithful color production at competitive costs.

Downstream of the error diffusion loop, further color adjustments can be made. These adjustments can be made to favor certain memory colors, such as flesh tones, "sky" blue, and "grass" green. In addition, certain color substitutions are made to avoid colors that have undesirable properties. For example, some colors require so much ink that they warp the print paper. Such adjustments are referred to as "device state limiting". The printed image is the result of the error diffusion and device state limiting.

Demand for higher standards for color production continues to grow so that a need has arisen for even more faithful color production using discrete tone printers. Preferably, memory and processing requirements for the improved printers can be limited to provide high printing throughput while minimizing costs.

SUMMARY OF THE INVENTION

The present invention provides for image production using a discrete color image production device, an error diffuser, and a vector color space converter. The device produces an image as a function of output image data that assigns to pixels colors in a device state space constituted by the colors that the output device can apply to a single image pixel. The error diffuser implements color error diffusion in a diffusion color space; the diffusion color space being different from and having higher color resolution than said device state space. The error diffusion provides for colors that are not directly produced by the device. The converter converts image data in the diffusion space to output image data in the device state space.

The present invention requires a vector color conversion between the diffusion space and the device state space. A "vector color conversion" is contrasted with a "scalar color conversion", in which the conversion can be expressed independently for each color dimension. This contrast can be expressed symbolically. Let (s1, s2, s3) be the coordinates of a color in a three-dimensional source color space, and let (t1, t2, t3) be the coordinates of the color in a three-dimensional target color space to which the source color is converted. A color conversion can be expressed as (t1, t2, t3)=f(s1, s2, s3). If this function can be reduced to the form t1=f1(s1), t2=f2(s2), and t3=f3(s3), then the conversion is scalar. If such a reduction is not possible, the conversion is vector. "Vector" and "scalar" are treated herein as mutually exhaustive and exclusive.

Although not generally considered a color conversion, the quantization that accompanies error diffusion in the above-described prior art is, in fact, a scalar color conversion. In stipulating a vector color conversion, the invention effectively decouples selection of the diffusion space from the device space. This decoupling provides for three advantages over the prior art: 1) freedom to select an optimal diffusion space; 2) a capability of combining a source space color conversion and error diffusion; and 3) a capability of folding device-state limiting into the diffusion loop.

First, the present invention permits an optimal diffusion space to be selected independently of the device space. Thus, the diffusion color space can be perceptually linear. A "perceptually linear" color space is one in which differences in color coordinates correspond to perceived differences in colors. In other words, if the difference between one pair of color-space coordinates is the same as the difference between a second pair of color-space coordinates, then the difference between colors corresponding to the first pair of coordinates will appear to be the same as the difference between colors corresponding to the second pair of coordinates.

Most error diffusion implementations are limited to performing error diffusion in the device space. Device spaces are typically nonlinear, yet the employed diffusion algorithms do not compensate for this nonlinearity so color fidelity suffers. The present invention provides for error diffusion in a space other than the device space. By selecting this diffusion space so that it is perceptually linear, color fidelity is enhanced.

Second, the diffusion space can be the original space in which the image is defined. In the prior art, if the original space is different than the device space, a color conversion is used to convert the image to the device space. This conversion is intensive in that it typically is from one continuous-tone space to another. Furthermore, it is followed by a quantization step. If diffusion is performed in the original space, the conversion is directly from the original space to the device state space, obviating the need for the intensive conversion to a continuous-tone device space. If the original space is perceptually linear or otherwise optimized for error diffusion, then the first and second advantages are combined.

Combining diffusion and color conversion reduces computational errors. In the prior art, errors are introduced during both color conversion and error diffusion. The conversion and diffusion errors are independent and cumulative. The present invention combines conversion and diffusion so that only a single computational error arises.

Third, the color conversion can incorporate device-state limiting. Although not usually considered so, device-state limiting is a color space conversion. While, scalar device-state limitations are possible, in practice they are generally vector color space conversions. Combining a vector device-state limitation with a quantization yields a vector color space conversion. Thus, the present invention contemplates a conversion directly to a limited device state space, e.g., excluding undesirable colors. This eliminates the need for a separate device limitations step. More importantly, the device state limitations are taken into account in the diffusion process, enhancing color production fidelity. These two advantages apply whether the diffusion space is a continuous-tone device space, a perceptually linear space, or any other original space.

The preferred error diffuser includes an image compensator, a color space reverter, an error calculator, and an error distributor. The image compensator adjusts the image in the diffusion color space. The adjusted image is converted by the color space converter to the device state color space for image production.

The output data is reverted to the diffusion color space by the color space reverter. "Reverter" indicates a conversion to a color space that the image was in before conversion to the device state color space. If the diffusion space is skewed relative to the device state space, the reversion is vectorial, otherwise it can be scaler. The error calculator determines color errors by comparing the adjusted image data with the reverted image data in the diffusion color space. The error distributor distributes color errors to neighboring pixels to provide compensation vectors. The compensation vectors are used by the image compensator to adjust image data, completing the error diffusion loop.

The color space reverter is distinctive in that it converts color away from the space used for output. The reverter permits output data to be concurrently available in the diffusion space for color error diffusion. The reverter thus conveniently provides for diffusion and output in different color spaces. There are, of course, mathematically equivalent methods of achieving the same result; however, the reverter approach turns out to be computationally efficient. As a result, considerable savings in memory size for color lookup tables and conversion processing are obtained.

The vector error diffusion technique of the present invention can be applied to defining color space conversion tables. Some table entries can be filled in using color analysis. The remaining entries can be interpolated using error diffusion.

In summary, the reduction of computation errors and the performance of error diffusion in a perceptually linear space enhance color fidelity. The merging of error diffusion and color conversion in a single step results in considerable savings in processing and memory requirements. These and other features and advantages of the present invention are apparent from the description below with reference to the following drawings.

DESCRIPTION OF THE PREFERRED EMBODIMENTS

Figure 1:
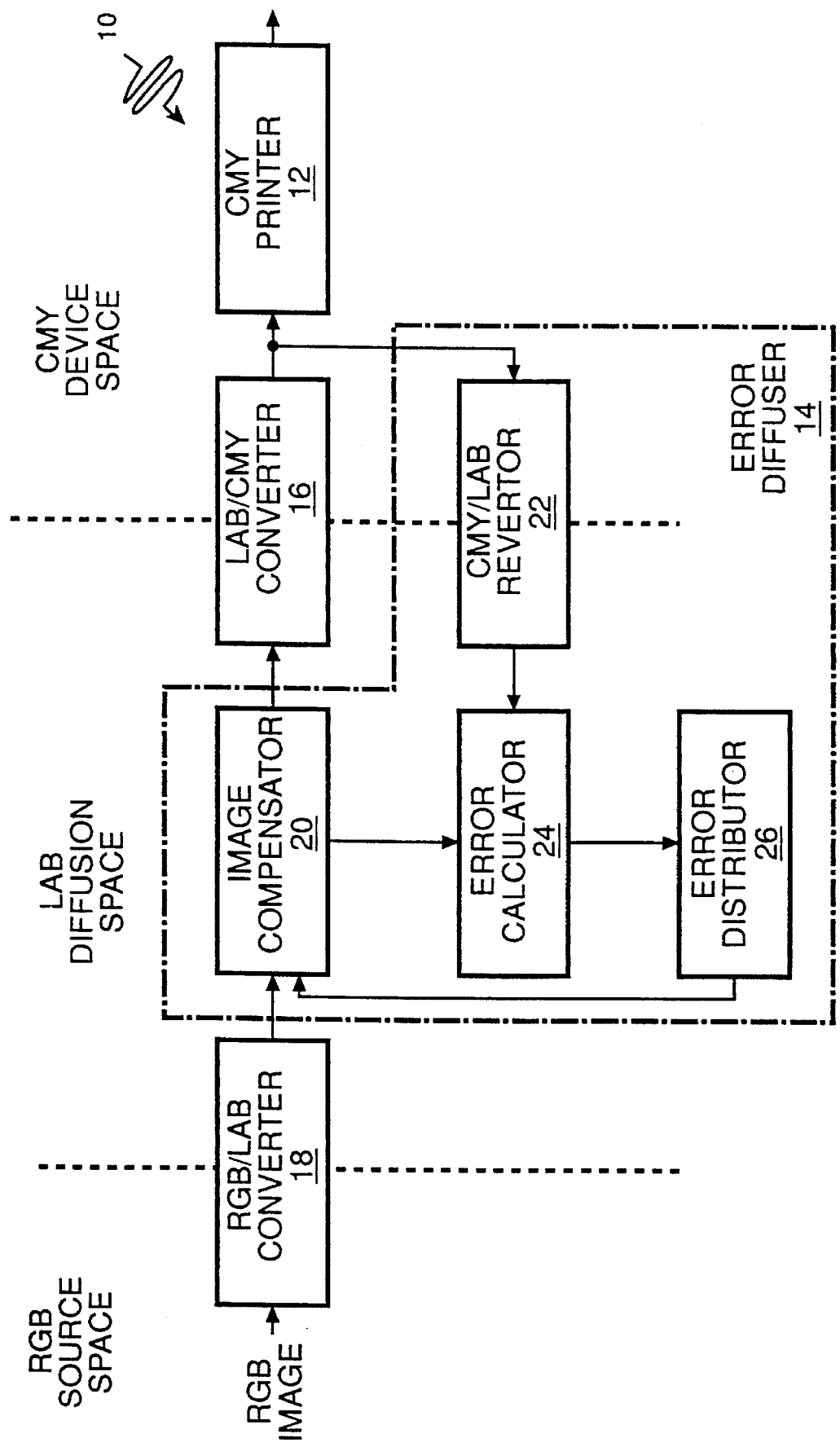
FIG. 1 is a block diagram of a color printing system in accordance with the present invention.

In accordance with the present invention, a color printing system 10 includes a discrete color printer 12, a color error diffuser 14, and a LAB/CMY converter 16, as shown in FIG. 1. Color printer 12 prints images from output image data assigning colors from a discrete CMY device state color space to image pixels. LAB/CMY converter 16 converts colors from a continuous LAB color space to the CMY device state color space. System 10 includes an RGB/LAB converter 18 for source image data originally in an RGB space rather than in the preferred LAB space.

Color error diffuser 14 includes an image compensator 20, an CMY/LAB color space reverter 22, an error calculator 24, and an error distributor 26. Image compensator 20 adjusts source image data in the LAB color space to provide adjusted image data in the LAB color space. CMY/LAB reverter 22 converts output image data from converter 16 back into LAB space as reverted image data. Error calculator 24 subtracts reverted image data from adjusted image data on a pixel-by-pixel basis to provide color error data for each pixel. Image distributor 26 computes compensation vectors from the color error data. The compensation vectors are used by image compensator 20 to convert source image data to adjusted image data.

Preferably, source image data is provided in LAB color space. To obtain source image data in the LAB color space when the source image data is provided in another color space, a "front-end" color space converter can be used. RGB/LAB converter 18 provides for conversion of source image data in RGB color space to source image data in LAB color space.

Herein, "LAB" means CIELAB, and internationally standardized color space used for color measurement. The "L" dimension corresponds to lightness; "A" corresponds to a red-green dimension. "B" corresponds to a "blue-yellow" dimension. This LAB system thus closely corresponds to the physiology of the human eye, the sensitivities of which lie along similar dimensions.

The LAB coordinate system is perceptually linear. If the vector difference between colors C1 and C2 is the same as the vector difference between colors C3 and C4 in LAB space, then the difference between colors C1 and C2 will appear to be the same as the difference between colors C3 and C4 to a human observer. Moreover, the LAB coordinate system is normalized in that, under certain specified conditions, colors separated by one unit or more are distinguishable by humans, while colors separated by less than one unit are not.

Figure 2:
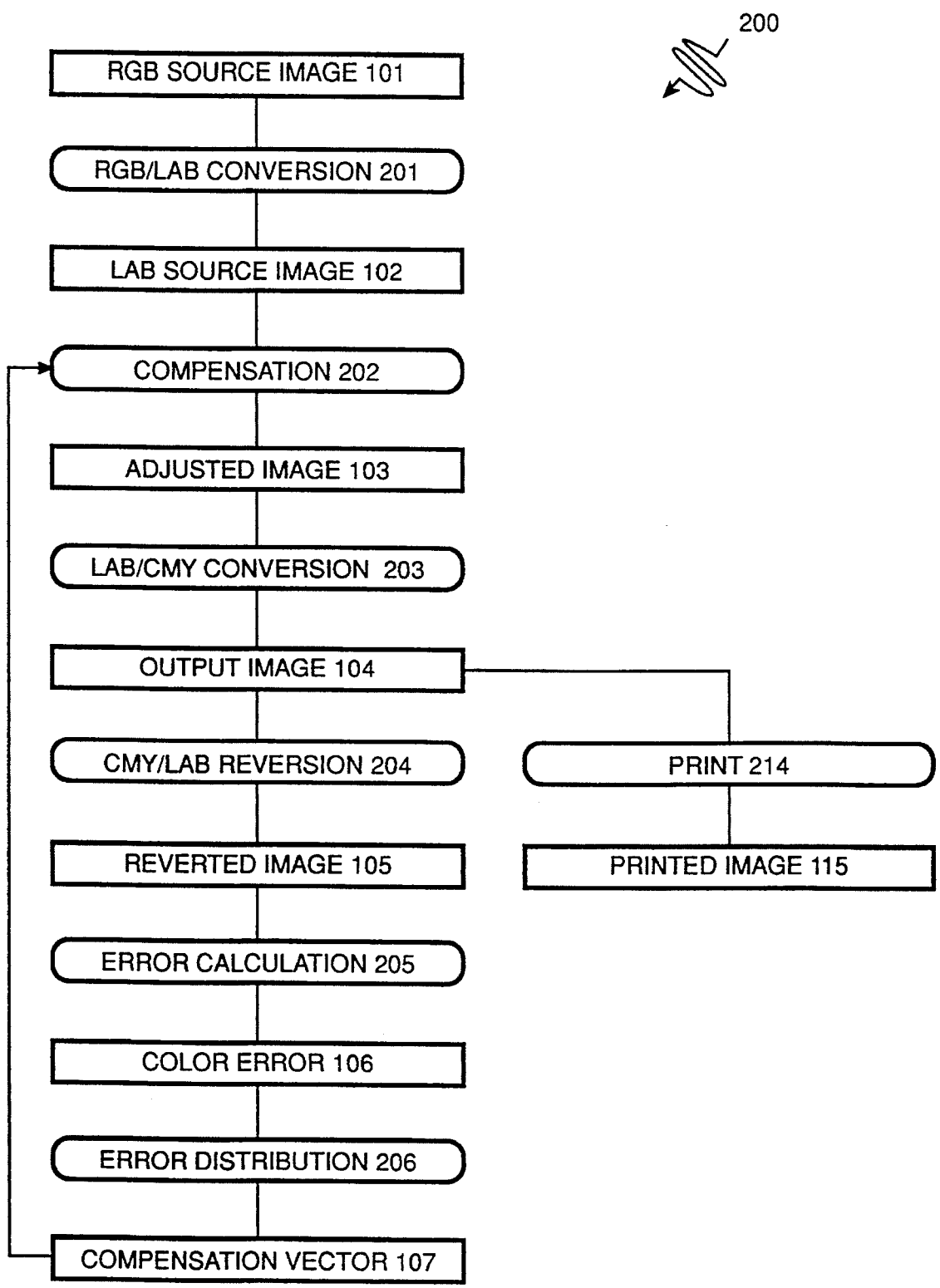
FIG. 2 is a flow chart of a method in accordance with the present invention practiced using the system of FIG. 1. Boxes with sharp corners are stages in the method; boxes with rounded corners are steps in the method.

Color printing system 10 provides for printing of color images in accordance with color printing method 200, illustrated in FIG. 2. Method 200 can begin with RGB source image data at stage 101. Preliminary step 201 then involves a pixel-by-pixel RGB/LAB color space conversion to yield LAB source image data at stage 102. The image is processed pixel-by-pixel.

The source image defined in LAB space is then adjusted at step 202. The adjustment is the result of the error diffusion process. Since no errors will have been accumulated before the first pixel is processed, the color of the first pixel is not changed. For consistency, the first pixel is considered adjusted by zero in step 202. The result of the adjustment is adjusted image data at stage 103.

The adjusted image data of stage 103 undergoes a LAB/CMY conversion at step 203. Prior art printers converted first to a continuous CMY space and then to a discrete device CMY space to provide for error diffusion in a device color space. The present invention skips the conversion to the continuous CMY space and converts directly into the device state color space. Not only is a conversion step avoided, but the direct conversion is less processing intensive than the prior art conversion to the continuous device space. Instead of a continuous-to continuous (24-bit to 24-bit) conversion, the conversion is to an 8-bit color space. Since the target space is relatively low resolution, one can drop two bits off each source dimension with negligible effect on color fidelity. Thus, the conversion can be 18/8 bits. Accordingly, processing requirements are reduced by well over an order of magnitude with no loss of color fidelity. The result of the LAB/CMY conversion is output image data at stage 104.

The output image data can directly or indirectly indicate the amount of ink of each printer color to be printed for a given pixel. In other words, the output image data indicates ink color, as well as dot size and/or dot density for each color for each pixel. Some printers simplify the device state color space to an index of printer states. Defining states makes it easier to provide for certain memory colors, such as flesh tones, "sky" blue, and "grass" green. In addition, it is easy to exclude certain colors that have undesirable properties; for example, some colors require so much ink that they warp the print paper.

The present invention accommodates any number of device state implementations in this regard; it remains appropriate to consider the allowed device states as defining a CMY color space. In any event, the printer prints the color required for each pixel at step 214. The result is ink on a sheet of print media, e.g., paper. The cumulative result of the printing is a printed image at stage 115.

The output image data is also reverted from the CMY device state space to the LAB diffusion space at step 105. The result of this reversion is reverted image data at stage 105. The LAB space is 24 bits, while the device space is 8-bits. Due to the color resolution reduction of the LAB/CMY conversion of step 203, the reverted image data resulting from step 204 generally differs from the adjusted image data. This difference is evaluated at step 205 by comparing the adjusted image data and the reverted image data for each pixel. The result is a color error vector of stage 106.

The color error vector is distributed at step 206 according to the employed vector error diffusion algorithm, which is the vector analog of the diffusion algorithm described in U.S. Pat. No. 4,680,645. Alternatively, other error diffusion algorithms can be employed. The error diffusion algorithm distributes the vector error to subsequently processed neighboring pixels. In a simple error diffusion case, the error is distributed entirely to the next pixel to be processed. However, the preferred diffusion algorithm distributes the vector error to plural pixels. In this case, each pixel receives contributions from the errors resulting from plural previously processed neighboring pixels. These errors are summed by error distributor 26. The sum for each pixel is a compensation vector of stage 107. Where the entire vector error is distributed to only one other pixel there is no error accumulation; in this case, the compensation vector is the same as the vector error.

The compensation vector 107 for a given pixel is used in the adjustment of that pixel as it is processed at the respective iteration of step 202. Steps 202 through 206 (and step 214) are then iterated until the image is completed.

CMY/LAB reverter 26 is a color lookup table. It can be constructed by printing a patch of color for each device state of printer 12. A colorimetric analysis can determine the LAB space color corresponding to each device state. The device state is the address of the color lookup table, and the colorimetric reading for the patch corresponding to that device state is the contents at that address. If their are 256 device states, then the color lookup table has 256 addresses, each with a 24-bit entry. Due to the small size of this table, memory requirements are small and processing is fast.

LAB/CMY converter 16 is also a color lookup table. The LAB space is 24 bits. However, since the target space is only eight bits, two bits are dropped from each LAB space dimension with negligible effect on color fidelity. Thus, converter 16 can be considered a three-dimensional matrix with three six-bit address dimensions. 256 addresses correspond to contents of reverter 26. These converter addresses are filled with the corresponding device state addresses of reverter 26.

For each remaining converter address, the closest of the LAB coordinate in reverter 26 is determined. Closest can be in terms of Euclidean distance; alternatively, a more complex criterion can be used. The corresponding device state is then entered in the converter table. The result is a matrix with LAB coordinate addresses and device states as contents. Converter 16 is thus an 18/8 bit look up table, requiring about 256 kilobytes (KB) of memory.

RGB/LAB converter 18 is a 24/24 bit converter. Preferably, an 18/24 bit table is used with trilinear interpolation to limit the size of the conversion table. This RGB/LAB table can be filled as follows. First, a number of addresses are filled colorimetrically. For example, 216 colors providing all combinations of 6 values (e.g., 0, 51, 102, 153, 204, and 255) for each of the three RGB color dimensions are displayed as patches on an RGB monitor. The patches are color analyzed to provide colors in LAB space. The LAB values are entered as contents at the respective RGB addresses.

The remaining RGB addresses are filled using an error diffusion interpolation method. For a given untilled RGB address, a large number, e.g., 100, "pixels" of the address color are processed. The first pixel is processed by finding the closest of the 216 RGB addresses, and recording the corresponding LAB color. The difference between the address being processed and the closest of the 216 is treated as a color error. This color error is added ("diffused") to the second pixel. The adjusted second pixel is then processed as was the first pixel. Processing continues until all 100 pixels are processed. The average LAB value for all 100 pixels is then computed as the contents of the processed address.

If the average LAB value fails to converge, the desired color is presumably outside the color gamut of the monitor. In this case, a closest color within the gamut is assigned to the processed address. The closest color can be one within the gamut with the smallest Euclidean distance to the calculated color. Other criterion can be added, for example picking the closest color with the same lightness or hue.

Convergence can be determined in a number of ways. For example, the average of the 100 addresses selected from the 216 analyzed addresses can be compared to the processed RGB address. The difference should be less than unity with convergence and greater than 100 with divergence. In practice, four, or any number between 2 and 20 can be used to test for convergence.

This simulated error diffusion interpolation technique applies equally well where the source color space is the colorimetric color space and the target color space is the device space. For example, the source data can be in LAB space to be printed on a CMY printer that is either continuous tone or one for which half-toning is done in CMY space. The color table is partially filled colorimetrically. For each LAB address that was not filled colorimetrically, a series of pixels having the address as its color is processed. The closest analyzed LAB address is found, the corresponding CMY color is recorded, and the error between the closest analyzed LAB address and the address being processed is diffused to the next pixel to be processed. The average RGB for the series of pixels is the color entered at the address being processed. The average closest LAB address can be compared with the processed LAB address to provide a convergence criterion. If the difference is less than four, the average RGB is used. If the difference is greater than four, a closet color within the device gamut is substituted.

In the embodiment detailed above, color error diffusion is performed in LAB space for output on a CMY printer. The present invention provides for different combinations of color spaces. For example, the invention provides for CMYK printing, RGB displays, etc. Diffusion can be done in LAB space, another perceptually linear space such as LUV, or any other color space.

Whenever the coordinates of the target space are skewed relative to those of the source space, the color conversion from the source space to the color space is vectorial. Diffusion can be performed in a continuous-tone device space, provided that the conversion to a limited device state space is nonscalar.

Where the diffusion is performed in the color space in which an image is originally defined, considerable processing is saved relative to the prior art approach of performing color space conversion and error diffusion separately. Other diffusion spaces and device spaces can have two, three, four or more dimensions. Obviously, a two-dimensional color space cannot provide a full gamut of humanly distinguishable colors, but the advantages of the present invention still pertain.

The detailed embodiment provides for error diffusion in a space other than the device space by reverting output image data to the diffusion space. However, the present invention provides for error diffusion without reversion. For example, the reverter output of the preferred embodiment can be provided directly by the device state color converter in an alternative embodiment. In other words, the color space converter can provide two outputs, one a device state output to the printer and a color error in the diffusion space.

Error diffusion usually acts upon image data serially. However, highest quality results can be achieved by symmetrically diffusing color errors to all neighboring pixels. To this end, an image can be completely batch processed using a symmetrical error diffusion algorithm. The resulting image is stored in the device state space and can be printed directly without further processing.

In the preferred embodiment, the output device is a printer. However, the invention applies to other discrete color output devices such as digital cathode-ray tube monitors, liquid crystal displays, and other discrete color output devices. These and other modifications to and variations upon the preferred embodiments are provided for by the present invention, the scope of which is limited only by the following claims.

What is claimed is:

1. A color production system for producing a color image from source image data, said system comprising:

a discrete-tone color image production device for producing said color image as a function of output image data, said output image data assigning to image pixels colors from a device state color space;

an error diffuser for implementing color error diffusion in a diffusion color space to provide adjusted image data from said source image data as a function of said output image data in said diffusion color space, said source image data assigning colors in said diffusion color space to said pixels, said adjusted image data assigning colors in said diffusion color space to said pixels, said diffusion color space having greater color resolution than said device state color space; and a vector color space converter for converting said adjusted image data to said output image data, said color space converter performing a vector color space conversion on said adjusted image data to obtain said output image data, said color space converter being coupled to said error diffuser for receiving said adjusted image data therefrom, said color space converter being coupled to said color image production device for providing said output image data thereto.

2. A system as recited in claim 1 wherein said diffusion space is perceptually linear.

3. A color production system for producing a color image from source image data, said system comprising:

a discrete-tone color image production device for producing said color image as a function of output image data, said output image data assigning to image pixels colors from a device state color space;

an error diffuser for implementing color error diffusion in a diffusion color space to provide adjusted image data from said source image data as a function of said output image data in said diffusion color space, said source image data assigning colors in said diffusion color space to said pixels, said adjusted image data assigning colors in said diffusion color space to said pixels, said diffusion color space having greater color resolution than said device state color space; said error diffuser including an image compensator for adjusting said source image data by combining compensation vectors therewith on a pixel-by-pixel basis to provide said adjusted image data, a color space reverter for converting said output image data to reverted image data in said diffusion color space, said color space reverter being coupled to said color space converter for receiving said output image data therefrom, an error calculator for calculating color errors between said adjusted image data and said reverted image data, said error calculator being coupled to said image compensator for receiving said adjusted image data therefrom, said error calculator being coupled to said color space reverter for receiving said reverted image data therefrom, and an error distributor for determining said compensation vectors as a function of said color errors, said error distributor being coupled to said error calculator for receiving said color errors therefrom, said error distributor being coupled to said image compensator for providing said compensation vectors thereto; and a vector color space converter for converting said adjusted image data to said output image data, said vector color space converter performing a vector color space conversion on said adjusted image data to obtain said output image data, said vector color space converter being coupled to said error diffuser for receiving said adjusted image data therefrom, said vector color space converter being coupled to said color image product device for providing said output image data thereto.

4. A system as recited in claim 3 wherein said diffusion space is perceptually linear.

5. A method of producing a color image based on source image data, said method comprising:

performing error diffusion in a diffusion color space to obtain adjusted image data from said source image data, said adjusted image data being a function of said source image data and output image data, said error diffusion involving adjusting said source image data by combining therewith compensation vectors on a pixel-by-pixel basis, reverting said output image data to said diffusion color space to obtain reverted image data in said diffusion color space, calculating color errors by comparing said adjusted image data with said reverted image data on a pixel-by-pixel basis, and determining said compensation vectors as a function of said color errors;

converting said adjusted image data to a device state color space, said device state color space having lower resolution than said diffusion color space, the conversion being a vector conversion; and producing said color image according to said output image data.

6. A method as recited in claim 5 wherein said diffusion color space is perceptually linear.

* * * * *